Patented Oct. 13, 1942

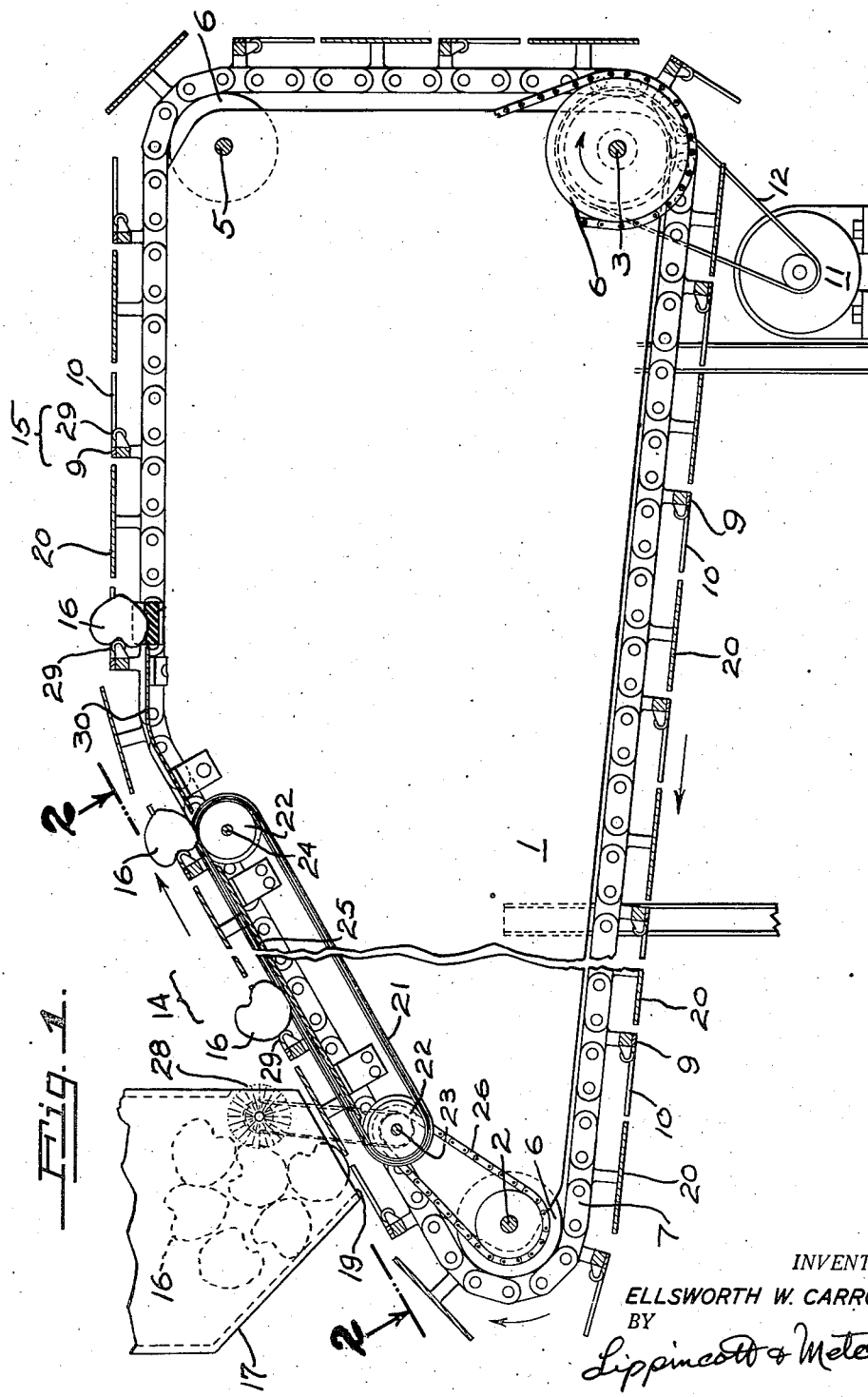

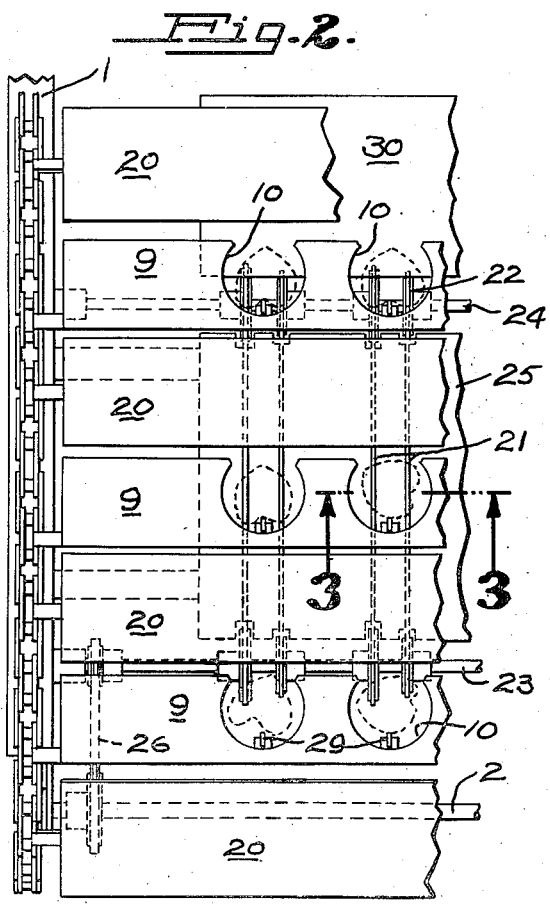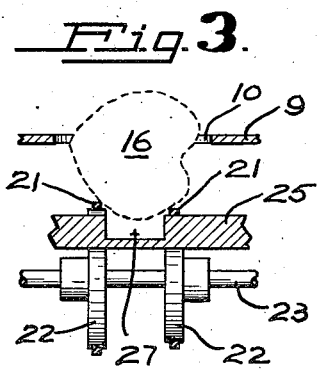

2,298,614

UNITED STATES PATENT OFFICE 2,298,614

FRUIT ORIENTATOR WITH LINEAR DRIVING MEMBER

Ellsworth W. Carroll, San Francisco, Calif., assignor to S & W Fine Foods, Inc., San Francisco, Calif., a corporation of California Application September 16, 1940, Serial No. 356,952

11 Claims. (Cl. 198—33)

My invention relates to fruit orientating mechanism, and more particularly to a means by which indented fruit may be orientated into a specific position so that the fruit may be pitted along a predetermined desired axis thereof.

Among the objects of my invention are: to provide a means of orientating indented fruit in a moving conveyor; to provide a means of orientating indented fruit by frictionally rotating the fruit during progression along a predetermined path; to provide a means of orientating fruit on an endless conveyor; to provide a means of loading, and orientating indented fruit.

Other objects of my invention will be apparent or will be specifically pointed out in the description forming a part of this specification, but I do not limit myself to the embodiment of the invention herein described, as various forms may be adopted within the scope of the claims.

In my prior applications Serial No. 211,140, filed June 1, 1938, entitled Full automatic orientator and Serial No. 294,453, filed September 12, 1939, entitled Continuous fruit orientating device, the latter now matured into Patent No. 2,220,511, I have described and claimed a means of orientating fruit having a stem indent, which rotates the fruit, and then utilizing the registration of the stem indent with a pilot mechanism to cause rotation to cease. The orientating mechanisms utilized in my above cited applications were adapted to operate on the fruit while the fruit was stationary, rather than while the fruit was being progressed by a conveyor, thus rendering the apparatus more adapted for intermittent conveyor progression than continuous conveyor progression. The present application however, concerns a mechanism which can be utilized with either intermittent or continuous progression of the conveyor, as will be readily understood by those skilled in the art, but I have shown and described the device as having a continuously operating conveyor.

Broadly, the orientating mechanism of my present invention includes an endless conveyor which is progressed over a predetermined path, a portion of which is devoted to orientation of indented fruit such as cherries for example. The preferred type of orientation mechanism that I use in conjunction with the conveyor, comprises elongated fruit rotating means moving along a path parallel to the progression of the fruit and partly supporting the fruit against gravity, so that a frictional contact will take place between the fruit and the fruit rotating means as the fruit is being progressed by the conveyor in fruit confining means, which are so dimensioned as to allow free revolution of the fruit. I move the fruit rotating means at a different speed than the conveyor, thereby causing rotation of the fruit. Means are provided which will register with the stem indent area of the fruit at predetermined position of the fruit with respect to the fruit confining means, this registration causing the fruit to cease rotation due to an opposition to the friction between the fruit rotating means and the fruit. Thus, even though the fruit is further subjected to action of the fruit rotating member, the fruit once orientated, no longer rotates but stays in the proper orientated position during the remainder of the time the fruit rotating means is operating, the latter slipping on the surface of the fruit. The fruit is then further progressed, still in orientated position to another position where the fruit may be subjected to a pitting operation along the axis as determined by the axis of orientation.

My invention may be more fully understood by direct reference to the drawings showing a preferred embodiment of my invention, wherein:

Fig. 1 is a longitudinal sectional view taken in a vertical plane, partly in elevation and partly in section.

Fig. 2 is a fragmentary view in elevation taken as indicated by the line 2—2 in Fig. 1.

Fig. 3 is a sectional view of the orientation mechanism taken as indicated by the line 3—3 in Fig. 3.

My invention may be more fully understood by direct reference to the drawings:

A frame 1 supports four spaced horizontal axles, a left lower axle 2, a right lower axle 3, a left upper axle 4 and a right upper axle 5. Each axle is provided with a pair of spaced sprockets 6, mounted thereon. The four sprockets on each side of the device carry a conveyor chain 7, so that each chain travels parallel endless paths. The chains are cross-connected by solid plates 9, each plate having a plurality of alined fruit apertures 10 thereon, the edges thereof forming means for confining and positioning a single fruit, so that there will be preferably a plurality of parallel rows of fruit progressed by the conveyor. The chains may be spaced at varying distances and any desired number of apertures may be made in each plate 9. However, I have found that twenty apertures per plate 9 is a convenient and practical number and that such a number does not make the machine too wide for practical commercial operation.

The chains are driven by a motor 11 driving lower right hand axle 3 through a main driving belt 12. I also prefer to space upper axles 4 and 5 a lesser distance apart than lower axles 2 and 3, so that the conveyor passes over an inclined portion 14 before passing over an upper horizontal portion 15, the chains being moved clockwise in Fig. 1.

Indented fruit 16 such as cherries, are placed in a hopper 17 having a lower opening 19, charging the cherries 16 into apertures 10 at the lower end of the inclined portion of the path 14. In order to prevent cherries from being discharged into the space between the apertures, I fill this space with planar plates 20 which extend between the apertured plates 9 and positioned coextensive with aperture plates 9. Thus the only openings through which cherry 16 may pass from hopper 17 are the fruit apertures 10. As the cherries pass into apertures 10, the cherries are prevent from falling through the apertures by the positioning beneath the cherries of a plurality of pairs of orientation belts 21 mounted on pulleys 22, these pulleys being mounted on spaced axles 23 and 24, journaled at the ends of inclined block 25. Axle 23 is driven from conveyor axle 2 by belt 26. One set of pulleys 22 is preferably of slightly larger diameter than the other set so that one belt travels at a higher speed than the other.

Orientation belt axles 23 and 24 are so positioned that the upper portions of belts 21 lie in adjacent planes paralled to the plane of progression of the conveyor, with a pair of belts below each line of apertures and extending in a line parallel to the line of progression of the conveyor. Pulleys 22 are so positioned with respect to the hopper, that each cherry, as it falls into an aperture 10 will have its lower surface resting on both of the belts of the related pair at points on each side of the vertical axis of the fruit. I prefer to form a channel 27 in inclined block 25 between the belts of each pair, so that the convex surface of the cherry will not come in contact with block 25 during rotation, as shown in Fig. 5.

In order to prevent cherries being carried upwardly on plates 9 or 20, I prefer to use a rotating brush 28 inside of hopper 17. This brush acts to clean all fruit from the top of the conveyor leaving only a single fruit in each aperture. At the rear of each aperture, and located at the junction of an aperture diameter extending in the direction of conveyor travel and the aperture edge, I position a pilot wheel 29 free to revolve on its pivot. This wheel 29 rotates in contact with the fruit as the fruit rotates in a vertical plane with its axis of revolution at 90° to the path of progression of the conveyor, and has a diameter sufficiently small to enter the stem indent of the fruit and seat therein firmly. At this time the wheel 29 ceases rotation as the fruit is stationary with relation thereto.

As the conveyor progresses upwardly it passes over sprockets 6 mounted on axle 4 and then assumes a horizontal path. As the fruit is progressed upwardly in the apertures and after being operated on by belts 21, as will be described later, their lower surfaces pass off from the belts onto a skid plate 30 while the conveyor is being progressed around axle 4. This skid plate is positioned the same distance below the plates 9 and 20 as were the belts and maintains this spacing until the end thereof from which point the fruit may be conducted to a cooperating mechanism for pitting the fruit thus orientated.

At this time it is believed that the action of the orientation belts as the fruit progresses upwardly over portion 14 of the conveyor path should be explained. Obviously the fruit 16 which is present in bulk in hopper 17 will drop into the apertures 10 in heterogeneous positions as far as the stem indent of the fruit is concerned. But immediately a fruit is received into an aperture, its lower surface makes contact with the related pair of driving belts and the fruit is held in frictional driving contact therewith by gravity. I prefer to move the upper portions of the driving belts in the direction of the progression of the conveyor, and at a higher speed. Obviously, if the belts were driven at the same speed as the conveyor no rotation of the fruit would occur. By driving the orientation belts faster than the progression of the conveyor, the fruit will be rotated in vertical planes in the apertures. When at any time during such rotation the stem indent of the fruit registers with pilot wheel 29, the pilot wheel, being smaller than the general stem indent area, will enter the stem indent and by bearing against the edge of the stem indent will oppose further rotation of the fruit by the belts. The belts continue to move, but the fruit will not rotate and will continue to progress upwardly sliding along the belts, retained in the proper orientated position, held there by the action of pilot wheel 29, until skid plate 30 is reached. Thereafter the fruit will be held firmly in the aperture against the pilot wheel 29, while the fruit is passing over the skid plate, against the rotative moment caused by progression over the skid plate. Consequently, any fruit reaching an orientated position at any time during its progression over the orientating belts while it is being subjected to rotation by the belts will remain in orientated position thereafter.

The inclined portion 14 of the conveyor path is made sufficiently long so that practically all of the fruit having normal stem indents will be properly orientated by the time they arrive at the top of the conveyor. Generally speaking, most indented fruit such as cherries, are not so accurately spherically formed that rotation will take place in a single fruit plane thereby causing the stem indent to say in a lateral position within the receptacle during rotation. However, I find that there is a small percentage of fruit which may be sufficiently spherical so that the rotation imparted by the orientation belts may not move the stem indents when in lateral positions, to central positions. In order to prevent a rotation of any fruit in the same fruit plane as it progresses up the incline, I prefer to mount each one of the orientation belts in a pair on driving pulleys of different diameters than the other bar so that one of the belts moves at a faster speed than the other. The belts engage the fruit on opposite sides of the vertical axis thereof and travel at different speeds and therefore impart a lateral component of rotation to the fruit, as well as a component in the plane of progression of the fruit. Thus the entire surface of the fruit is scanned past the pilot wheel 29, so that by the time the inclined path has been traversed it is virtually impossible for the stem indent of any fruit not to be presented to the pilot wheel at least once. I wish it distinctly understood however, that I do not wish to be limited in any manner to the use of a differential speed of each belt in a pair as by far the largest percentage of fruit will become orientated without the use of such differential belt speed. In order to salvage such few as might not be thus orientated however, I prefer to use the differential rate of progression of the orientation belts in each pair. When different size pulleys are used, one belt may be left slightly higher than the other, or the lowest one may be positioned level with the other by sliding it over the top surface of block 25.

Thus, it can be seen that practically all of the fruit loaded will reach the horizontal portion of the conveyor fully orientated.

I claim:

1. Means for orientating a substantially spherical fruit having a stem indent which includes fruit restraining means in which a fruit may rotate, means for progressing said restraining means along a predetermined path, fruit revolving means positioned to at least partially support said fruit against gravity when in said fruit restraining means as said fruit restraining means is progressed along said path, means for moving said fruit revolving means with respect to said fruit restraining means to revolve said fruit, and a pilot member shaped to enter and engage said stem indent, fixed in a predetermined position with respect to said fruit restraining means and movable therewith.

2. Means for orientating a substantially spherical fruit having a stem indent which includes a fruit restraining means in which a fruit may rotate, means for progressing said restraining means along a predetermined linear path, fruit revolving means positioned to at least partially support said fruit against gravity when in said restraining means as said restraining means is progressed along said path, means for moving said fruit revolving means with respect to said restraining means and in a path parallel to the path of progression of said restraining means to revolve said fruit, and a pilot member shaped to enter and engage said stem indent, fixed in a predetermined position with respect to said restraining means and movable therewith.

3. Means for orientating a substantially spherical fruit having a stem indent which includes a conveyor moving along a predetermined path, a plurality of spaced plates having apertures therein forming a part of said conveyer, fruit revolving means frictionally engaging the bottom of fruit in said apertures as said plates and fruit progress along said path, means for moving said fruit revolving means at a different speed than the speed of conveyor progression to rotate said fruit in said apertures and a pilot member shaped to enter and engage said stem indent and fixed to said plate in a predetermined position with respect to said apertures.

4. Means for orientating a substantially spherical fruit having a stem indent which includes a conveyor moving along a predetermined linear path, a plurality of spaced plates forming a part of said conveyor, said plates having fruit restraining apertures therein, linear fruit revolving means frictionally engaging the bottom of fruit in said apertures as said plates and fruit progress along said path, means for moving said fruit revolving means at a different speed than the speed of conveyor progression to rotate said fruit in said apertures, and a pilot member shaped to enter and engage said stem indent and positioned in a predetermined position with respect to each aperture, one of said latter members being attached to the rear edge of each aperture.

5. Apparatus in accordance with claim 4 wherein said fruit revolving means includes a pair of endless belts.

6. Apparatus in accordance with claim 4 wherein said fruit revolving means includes a pair of endless belts positioned to contact the lower surface of said fruit on each side of the vertical axis thereof.

7. Apparatus in accordance with claim 4 wherein said fruit revolving means includes a pair of endless belts driven at different speeds.

8. Apparatus in accordance with claim 4 wherein said fruit revolving means includes a pair of endless belts positioned to contact the lower surface of said fruit on each side of the vertical axis thereof together with means for driving each belt at a different speed.

9. Apparatus in accordance with claim 4 wherein said pilot member includes a wheel freely rotating on the rear edge of each of said receptacle apertures and having a portion projecting beyond said edge into said aperture in the direction of conveyor travel, said wheel having a curvature generally fitting the concavity of said stem indent.

10. In a device for orientating indented fruit, a pair of spaced parallel and elongated driving members, fruit positioning means for maintaining a fruit in simultaneous gravity contact with both of said members, means for moving said members relative to said positioning means to rotate said fruit, and a pilot member shaped to enter and engage the stem indent of a fruit in said fruit positioning means, fixed in a predetermined position with respect to said fruit restraining means.

11. In a device for orientating indented fruit, elongated driving means extending over a substantially linear path, a plurality of connected fruit positioning means for separately maintaining a plurality of fruit simultaneously in gravity contact with said driving means, means for moving said driving member relative to said fruit restraining means to rotate each fruit, means for moving said fruit restraining means along a path parallel to the extent of said elongated driving means, and a pilot member in a fixed position relative to said fruit positioning means and shaped to enter and engage the stem indent of each fruit when said indent is presented thereto during fruit rotation.

ELLSWORTH W. CARROLL.